(12) United States Patent
Weigel et al.

(10) Patent No.: US 7,117,989 B2
(45) Date of Patent: Oct. 10, 2006

(54) DEVICE FOR DETECTING THE TENSION OF SCRAPER CHAINS

(75) Inventors: Wilfried Weigel, Werne (DE); Gerold Wendler, Voerde (DE); Karl-Heinz Schurer, Herne (DE)

(73) Assignee: DBT GmbH, Lunen (DE)

( * ) Notice: Subject to any disclaimer, the term of this patent is extended or adjusted under 35 U.S.C. 154(b) by 299 days.

(21) Appl. No.: 10/892,809

(22) Filed: Jul. 16, 2004

(65) Prior Publication Data
US 2005/0056527 A1    Mar. 17, 2005

(30) Foreign Application Priority Data
Jul. 24, 2003  (DE)  ................. 203 11 436

(51) Int. Cl.
*B65G 43/00*  (2006.01)
(52) U.S. Cl. ............... 198/810.04; 198/810.01; 198/813; 198/502.1
(58) Field of Classification Search ........... 198/810.04, 198/810.01, 813, 502.1
See application file for complete search history.

(56) References Cited

U.S. PATENT DOCUMENTS

| | | | |
|---|---|---|---|
| 4,587,852 A * | 5/1986 | Butler et al. ............. | 73/826 |
| 4,657,131 A | 4/1987 | Brychta et al. | |
| 5,002,177 A * | 3/1991 | Winning ............... | 198/810.04 |
| 5,054,607 A | 10/1991 | Braun et al. | |
| 5,647,640 A | 7/1997 | Heintzmann et al. | |
| 5,917,328 A * | 6/1999 | Dimmick et al. .......... | 324/686 |
| 5,997,423 A * | 12/1999 | Kwon ................. | 474/103 |
| 6,029,798 A * | 2/2000 | Miller ................ | 198/810.01 |
| 6,088,559 A * | 7/2000 | Costanza et al. .......... | 399/165 |

FOREIGN PATENT DOCUMENTS

| | | |
|---|---|---|
| DE | 9 08 694 | 4/1954 |
| DE | 2017949 | 4/1970 |
| DE | 3406519 | 8/1985 |
| DE | 38 41 884 | 6/1990 |
| DE | 39 27 892 | 2/1991 |
| DE | 195 04 779 | 8/1996 |

OTHER PUBLICATIONS

German Search Report, Jun. 9, 2004, 3 pages, Germany.

* cited by examiner

*Primary Examiner*—Gene O. Crawford
*Assistant Examiner*—Rashmi Sharma
(74) *Attorney, Agent, or Firm*—Fay, Sharpe, Fagan, Minnich & McKee, LLP

(57) ABSTRACT

A device for detection and adjustment of the tension of a scraper chain of a chain conveyor, in particular of a face conveyor, having a tensionable return station, on which a spoked chainwheel to reverse the scraper chain, having chain links and scrapers attached thereto, is supported between the bottom race and the top race. The devices including a sensor which determines the tension of the scraper chain at the return station and the sensor having a swivellable sensor body coupled with a shaft encoder. The sensor body being in the top race and in contact with the upper face of the scraper chain in a measurement zone with provision being made in the measuring zone for vertical play for the run of the scrapers and/or the chain links.

17 Claims, 1 Drawing Sheet

DEVICE FOR DETECTING THE TENSION OF SCRAPER CHAINS

This application claims priority to German patent application No. 203 11 436.1, filed Jul. 24, 2003, the disclosure of which is incorporated herein by reference.

The invention relates to a device for detection and adjustment of the tension of a scraper chain of a chain conveyor, in particular for detection and adjustment of a face conveyor having a tensionable return station with a spoked chainwheel. The adjustment includes both a slack chain and an overtensioned scraper chain.

BACKGROUND OF THE INVENTION

Basic steps to avoid slack chains and to optimize the run of the scraper chain on a face conveyor are known from German patent DE 2 017 949 A1 held by the applicant. In this citation it is stated that the sensor may theoretically be optical, electrical, magnetic or mechanical. In the exemplary embodiment of this citation a sensor is proposed that is fitted with a guide shoe which is steered by a lever and through which runs a section of the bottom race of the scraper chain behind the main drive of the scraper chain conveyor. The lever is pretensioned by means of a tensioning spring, and the deflection of the lever, which is dependent on the tension of the scraper chain in the bottom race, actuates a contact sensor, either one located above the lever or one located below it, such that depending on which contact transmitter has been triggered the tensioning drive for the return station will be extended or retracted.

From "Glückauf" 128 (1992), page 189, it is known that in particular on face conveyors the control of the tension of the scraper chain, especially the control of a dangling or slacking chain, is of major importance for operating a scraper chain conveyor safely and with avoidance of wear. If the chain is excessively pretensioned, an increased power demand will be observed, owing to increased friction throughout the complete system, and the vibratory stresses throughout the system may increase, which may result in chain fatigue and increased wear of all system components. If the chain is insufficiently pretensioned, the conveyor chain may disengage, slip, jam or jump out of the spoked chainwheel, which may cause damage to system components, including to the machine frame. In order to determine the tensions of the scraper chain, a measuring head is assigned both to the top race section of the scraper conveyor chain directly behind the auxiliary drive and to the bottom race section of the scraper conveyor chain directly behind the main drive. The signals of said measuring head are transmitted to an evaluation unit in order to extend or retract the tensionable return station, depending on the measurement signals. The measuring head assigned to the bottom race section detects the catenary and the measuring head located in the top race detects the chain geometry, in other words the distance of the vertical and horizontal chain links from one another.

In the prior art, the tension of the chain is generally determined indirectly, in particular with pressure sensors, travel sensors or counting sensors. As an alternative, direct determination of the chain tension by means of inductive proximity sensors, which are installed in the top race of the conveyor, is also known. The use of indirect measuring sensors in underground mining is critical, owing to the high inductances of the proximity sensors, and long-term reliability can not be achieved using the known proximity sensors.

SUMMARY OF THE INVENTION

The object of the invention is to provide a device for detecting and adjusting the tension of the scraper chain, which determines the tension reliably and simply, which is not liable to wear and which can be easily replaced.

In accordance with the present invention, provided is a tensioning device for detection and adjustment of the tension of a scraper chain of a chain conveyor which includes a sensor which determines the tension of the scraper chain at the return station. More particularly, the device includes a sensor having a swivellable sensor body coupled with a shaft encoder that is in contact with the upper face of the scraper chain in a measurement zone where the scraper chain has vertical play.

According to another aspect of the invention, this task is achieved in that the sensor comprises a swiveling sensor body, coupled with a shaft encoder, which sensor body in the top race is in contact with the upper face of the scraper chain in a measuring zone, wherein in the measuring zone a vertical play for the run of the scrapers and the chain links is provided, such play preferably being free or unlimited. The invention consequently makes provision to detect the tension of the scraper chain directly by means of a sensing device, which is in contact with the scraper chain passing through the race, with the swiveling motion of the sensor body being used as a measurement for the chain tension and supplied as an actuating variable by means of the shaft encoder. Consequently, a measuring zone is provided in the machine frame, in which the scrapers and thus also the chain links run with vertical play, in other words without restrictive guidance, such as is normally provided in the chain conveyor's channel sections for the scraper chain.

According to yet another aspect of the invention, the scrapers run in the measuring zone without any restrictive guidance. It is particularly advantageous if the measuring zone extends between the upper vertex on the spoked chainwheel and a transitional section for restrictive guidance of the scrapers. Provision may be made in particular that restrictive guides for the scraper chain are located at least behind the measuring zone, and if appropriate also in front of it. These restrictive guides in the machine frame may consist in particular of hold-downs or lateral members, in which the ends of the scrapers are guided. It is further advantageous if the vertical play is greater at the beginning of the measuring zone than at the end of it.

In accordance with a further aspect of the invention, the sensor body may in particular incorporate a slider or consist of a slider, which is in contact with the upper face of the scraper chain links or scraper bodies such that the latter run under the sliding face with as little frictional loss as possible. In such an embodiment the sensor body may be designed as a comparatively crude component, with very low mechanical wear, and it would be particularly advantageous if the sensor body or the slider had a curved sliding surface. In the simplest embodiment the sensor body may be linked with a shaft in such a way that it cannot be turned, in particular with a shaft that is located on the machine frame and preferably directly forms the measuring shaft, such that the sensor body rotates with the shaft, the rotary motion of this shaft can be detected by the shaft encoder, in order to determine the relative position of the sensor body directly by way of the shaft position. To this end the measuring shaft is preferably mounted obliquely over the machine frame, so that the sensor body or the slider may be of an appropriate width.

In accordance with even yet a further aspect of the invention, the sensor body may be pressed against the upper face of the scraper chain by means of pretensioning devices. In a preferred embodiment the sensor body is designed in such a way that it is in contact with the upper face of the scraper chain only as a consequence of its own weight, in order not to distort the measurement through the use of pretensioning devices. In order to regulate the pretension an evaluation and control device is preferably provided, which can receive the measurement signals of the shaft encoder and which actuates the tensioning drive of the return station depending on the shaft encoder's measurement signals. The device according to the invention is in particular suitable for use on a machine frame where, in the measuring zone, the bottom of the top race rises continuously towards the spoked chainwheel.

The object of the invention is to provide a device for detecting and adjusting the tension of the scraper chain, which determines the tension reliably and simply which is not liable to wear and which can be easily replaced.

BRIEF DESCRIPTION OF THE DRAWINGS

The forgoing and other advantages and embodiments of the invention will be found in the following description of preferred embodiments of the present invention illustrated in the accompanying drawing in which.

DESCRIPTION OF PREFERRED EMBODIMENTS

Figure 1:
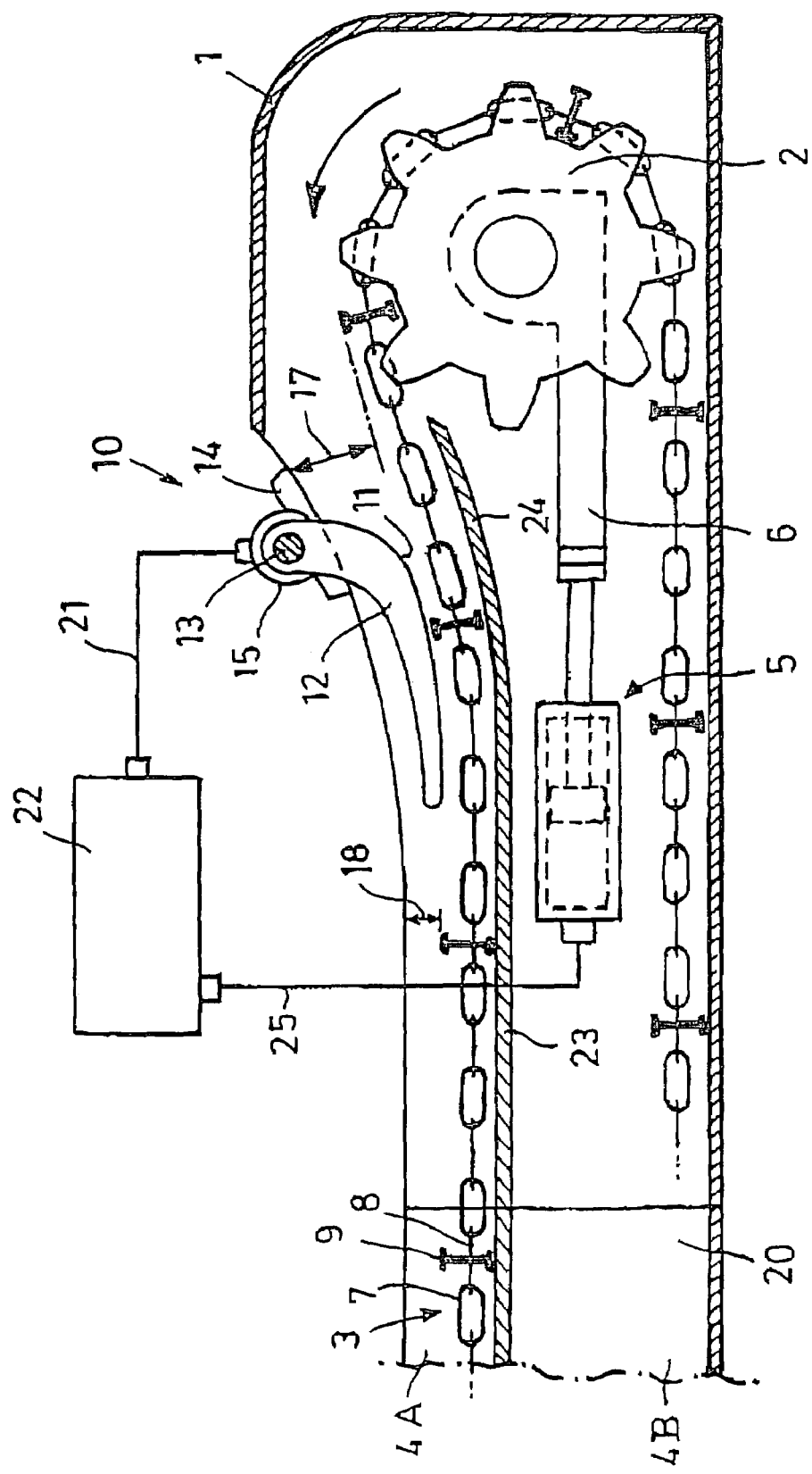
FIG. 1 is a schematic view of a device for detecting and tensioning a scraper chain in accordance with the present invention.

Referring now in greater detail to the drawing wherein the showing is for the purpose of illustrating preferred embodiments of the invention only and not for the purpose of limiting the invention, FIG. 1 shows the tensionable return station, marked as 1, which forms the auxiliary drive of a face conveyor, and on which a spoked chainwheel 2 is located, which may be powered by drives that are not shown in further detail here. Return station 1, which forms the auxiliary drive, is designed such that it can be tensioned, and in order to increase the tension in the scraper chain, designated overall by 3, spoked chainwheel 2 may be moved right or left in the figure, relative to channel sections 20 of the face conveyor, by means of a tensioning drive 5, which comprises at least one hydraulically extendible hydraulic cylinder 6, in order to increase the distance between spoked chainwheel 2 at the auxiliary drive and the one at the main drive (not shown) so as to avoid dangling or slack chains, or to reduce that distance so as to avoid overtensioned chains. A tensionable return station is known, for example, from German patent DE 36 04 488 C3. Scraper chain 3 comprises—in the known manner vertically disposed chain links 7 and horizontally disposed chain links 8, to which scrapers 9, shown only schematically, are attached. Scraper conveyor chain 3 may in particular be designed as a double center scraper chain, and scrapers 9 are then guided by having both of their ends (not shown) in guide members (also not shown) on channel sections 20 of the face conveyor, which is constructed in sections and extends as far as the main drive (not shown). All channel sections 20 and machine frame 1 and, where applicable, any intermediate or transitional channels located between them have a top race 4A and a bottom race 4B. In top race 4A the material to be conveyed, such as coal, is transported by means of scrapers 9 as far as the main drive, and in bottom race 4B the scrapers run back to the auxiliary drive. The constantly changing load conditions in the top race cause the tension in the top race and bottom race sections of scraper chain 3 to vary.

In order to detect the tension of scraper chain 3 a sensor, indicated overall by 10, is located on the frame of return station 1, which forms the auxiliary drive. The sensor has a sliding body or sensor body 12 with a curved sliding surface 11, which is coupled with a shaft 13 such that it cannot be turned, said shaft reaching obliquely over the conveying trough and return trough for scraper conveyor chain 3 in top race 4A of machine frame 1 of the chain conveyor. Shaft 13 is supported in bearing blocks 14, one of which is indicated schematically at the rear side face of return station 1. The weight of sensor body 12 causes its sliding surface 11 to be directly in contact with the upper face of a scraper 9 or with the upper face of vertical chain links 7 in the area of the measuring zone. At the same time, shaft 13, supported in bearing blocks 14 such that it can swivel, forms a measuring shaft, and by means of shaft encoder 15 the relative position of measuring shaft 13—and thus also the relative position or swiveled position of sensor body 12 rigidly coupled with it—may be detected and transmitted to the evaluation and control unit 22 via signal line 21. Depending on the measurement signal of shaft encoder 15, evaluation and control unit 22 then activates tensioning drive 5 of return station 1 via signal line 25.

In an extensive zone within top race 4A of return station 1, referred to below as the measurement zone and extending between points 17 and 18 in the drawing marked with double arrows, scraper conveyor chain 3 has vertical play. In other words, between point 17 and point 18 along the track in top race 4A, scraper chain 3 can essentially move freely in a vertical direction, i.e. perpendicularly to the bottom of top race 23, 24. In a preferred embodiment, conveyor chain 3 has a comparatively large amount of vertical play at point 17 and a smaller amount of play at point 18, as is made clear by the differing lengths of the arrows in the FIGURE. The upper vertex of spoked chainwheel 2 is higher than the actual running height of scraper conveyor chain 3 in top race 4A of channel sections 20, and the base of bottom race 23 has a section 24 in the measuring zone which rises towards spoked chainwheel 2.

In the exemplary embodiment shown, the scraper chain is running with optimum tension, i.e. some chain links in the measuring zone are slightly lifted away from the bottom of top race 24. When the chain is dangling, on the other hand, chain links 7, 8 and scrapers 9 within the area of the measuring zone and in the area of the machine frame are in contact at every point with the bottom of top race 23 or 24 of return station 1, and sensor body 12 is at its largest downwards deflection. This state is detected by evaluation and control device 22 and tensioning drive 5 is extended. If the tension of scraper chain 3 increases, vertical and horizontal chain links 7, 8 together with scrapers 9 of scraper chain 3 may move even higher in the measuring zone, due to the absence of restrictive guidance and the existing vertical play (17 or 18), which causes sensor body 12 to be swiveled clockwise and this deflection to be detected by shaft encoder 15 and transmitted to evaluation and control device 22 as a measurement signal. If the chain reaches a preset tension corresponding to that of a tight chain, this is detected directly by shaft encoder 15 as a result of the greater deflection of sensor body 12, and evaluation and control device 22 then activates tensioning drive 5, in some cases via a closed-loop control algorithm, through signal line 25 such that tensioning cylinder 6 is retracted in order to reduce the tension in scraper chain 3.

While considerable emphasis has been placed on the preferred embodiments of the invention illustrated and described herein, it will be appreciated that other embodiments can be made and that many changes can be made in the preferred embodiments without departing from the principles of the invention. Accordingly, it is to be distinctly understood that the foregoing descriptive matter is to be interpreted merely as illustrative of the invention and not as a limitation and that it is intended to include other embodiments and all modifications of the preferred embodiments insofar as they come within the scope of the appended claims or the eguivalents thereof.

A person skilled in the art will be able to deduce from the preceding description a number of variants, which are intended to fall within the scope of protection of the dependent claims. The measuring zone may extend only over one area of the machine frame. Alternatively, the measuring zone may also partially or completely extend over the area of one or more transitional channels, which are mounted between the machine frame supporting the spoked chainwheel and the individual channel sections of the chain conveyor. The base of the bottom race may also rise in a straight line in the area of the measuring zone or may have a recess.

The invention claimed is:

1. A device for detection and adjustment of the tension of a scraper chain of a chain conveyor, in particular of a face conveyor, having a tensionable return station, on which a spoked chainwheel to reverse the scraper chain, having chain links and scrapers attached thereto, is supported between a bottom race and a top race, said device comprising a sensor which determines the tension of a scraper chain at the return station, said sensor having a swivellable sensor body coupled with a shaft encoder, said sensor body being in contact with an upper face of the scraper chain in a measurement zone, the scraper chain having vertical play in said measurement zone.

2. The device of claim 1 wherein the scrapers of the scraper chain run in said measuring zone without restrictive guidance.

3. The device of claim 1 wherein said measuring zone extends between an upper vertex on the spoked chainwheel and a transition section for restrictive guidance of the scrapers.

4. The device of claim 1 further including restrictive guides for the scraper chain, said restrictive guides including hold-down retainers and being positioned before said measuring zone.

5. The device of claim 1 further including restrictive guides for the scraper chain, said restrictive guides including hold-down retainers and being positioned after said measuring zone.

6. The device of claim 5 wherein said restrictive guides further include hold-down retainers before said measuring zone.

7. The device of claim 1 wherein said measuring zone has a beginning and an end and said vertical play is greater at said beginning than at said end.

8. The device of claim 1 wherein said sensor body has a sliding face which engages at least one component of the scraper chain.

9. The device of claim 8 wherein said sliding face is curved.

10. The device of claim 1 wherein said sensor body is linked with a measuring shaft supported on a machine frame such that said sensor body rotates with said measuring shaft, said rotation being detectable by said shaft encoder.

11. The device of claim 10 wherein said measuring shaft is mounted obliquely over said machine frame.

12. The device of claim 1 wherein said sensor body is pressed against the scraper chain by its own weight.

13. The device of claim 1 wherein said sensor body is biased against the scraper chain.

14. The device of claim 1 further including an evaluation and control device which receives a measurement signal from said shaft encoder and a tensioning drive, said evaluation and control device actuating said tensioning drive based at least in part on said measurement signal.

15. The device of claim 1 wherein a portion of the top race is positioned in said measuring zone, said portion including a section that extends vertically and towards the spoked chainwheel.

16. The device of claim 15 wherein said section is arcuate.

17. The device of claim 15 wherein said sensor body is vertically spaced from said portion of the race.

* * * * *